Dec. 12, 1967   R. L. TIEDE ET AL   3,358,066
APPARATUS FOR MELTING AND FEEDING HEAT-SOFTENABLE MATERIALS
Filed April 22, 1964   3 Sheets-Sheet 2

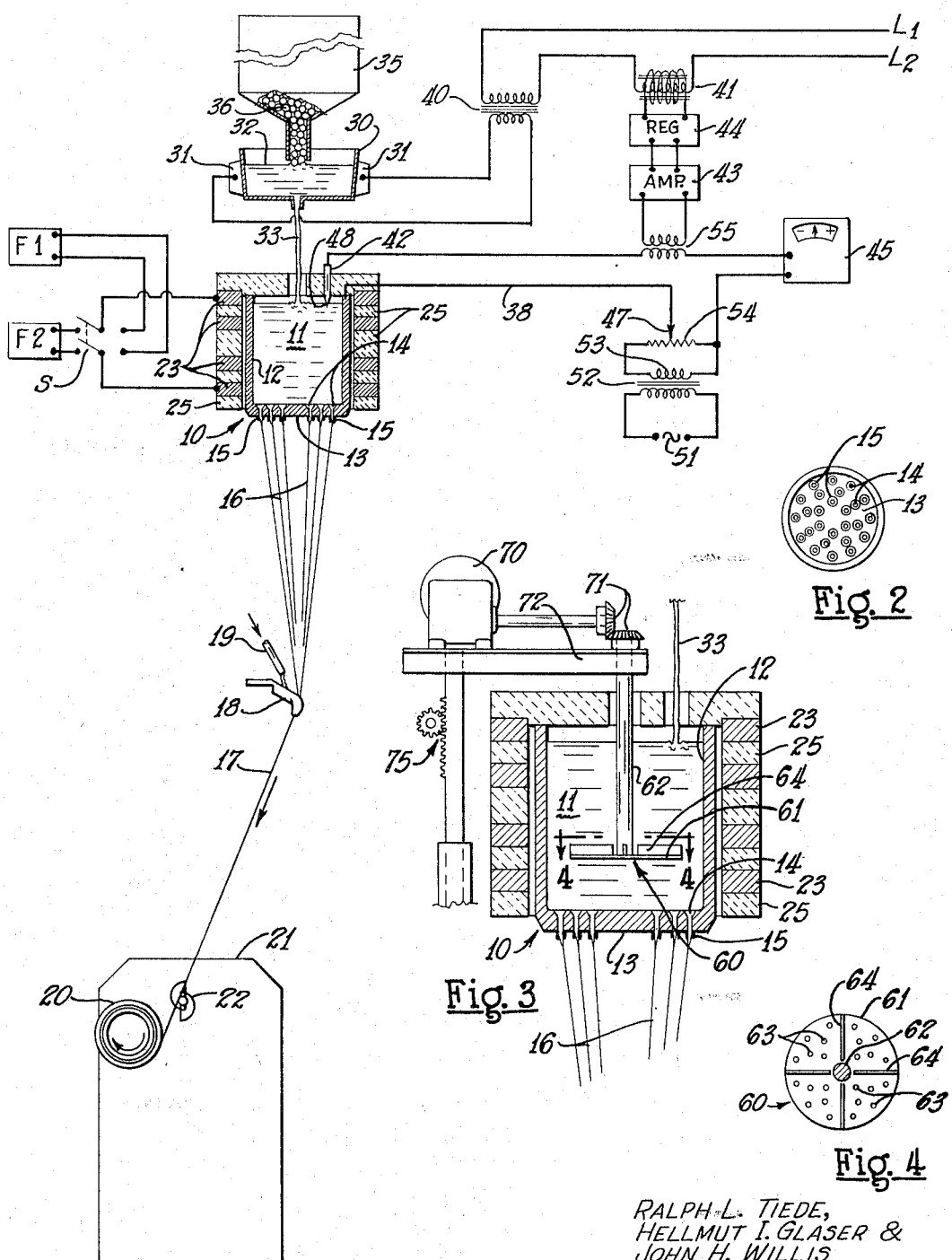

RALPH L. TIEDE,
HELLMUT I. GLASER &
JOHN H. WILLIS
INVENTORS

BY *Stachin & Overman*
ATTORNEYS

Dec. 12, 1967        R. L. TIEDE ET AL        3,358,066
APPARATUS FOR MELTING AND FEEDING HEAT-SOFTENABLE MATERIALS
Filed April 22, 1964                3 Sheets-Sheet 3

RALPH L. TIEDE,
HELLMUT I. GLASER &
JOHN H. WILLIS
            INVENTORS

BY
            ATTORNEYS

United States Patent Office 3,358,066
Patented Dec. 12, 1967

3,358,066
APPARATUS FOR MELTING AND FEEDING HEAT-SOFTENABLE MATERIALS
Ralph L. Tiede, Newark, Ohio, and Hellmut I. Glaser and John H. Willis, Anderson, S.C., assignors to Owens-Corning Fiberglas Corporation, a corporation of Delaware
Filed Apr. 22, 1964, Ser. No. 361,657
8 Claims. (Cl. 13—6)

This invention relates to improvements in the production of fibers from heat-softenable materials and particularly to a more stable continuous method and apparatus for producing fibers of siliceous material such as glass or the like which simultaneously effects an increase in quality and economy.

This invention is described particularly in connection with the production of continuous glass fibers wherein streams of molten glass are attenuated mechanically into continuous fibers of small diameter which are then gathered into a strand and wound into a package. Fibers thus produced are then usually processed into other textile forms such as yarns, cords, roving, etc., on conventional textile machinery for subsequent use in ever-widening fields of application.

In general, and in the textile fiber field in particular, it has been found advantageous to produce as fine a filament as possible. That is, as the diameter of the filament becomes smaller, there is achieved abrasion and flex resistance and a combination of properties which are superior for many purposes. For example, products made from the smallest diameter filament on the market today are sheerer and longer wearing. The resultant fabrics have a workability and printability not available before.

There are many problems encountered in producing as fine a filament as possible, however. The molten glass from which the filament is drawn must be free of seeds, cords, or other formations within the molten glass. This may be related to the temperature of the molten glass as well as other factors. The temperature of the molten glass in the area of the bushing tips also affects the diameter of the filament. Therefore, temperature control in the above examples, as well as others, is of utmost importance.

Accordingly, it is an object of this invention to provide an improved method and means for producing fibers from heat-softenable materials.

It is another object of this invention to provide an improved method and means for forming continuous glass fibers in a more trouble-free continuous operation than has been possible heretofore. We have discovered that by using a particular geometric form of feeder in combination with an impeller or stirrer and a particular type of heating that the temperature of the molten glass within the feeder and at the bushing tips may be controlled much more uniformly.

The uniformity of temperature may be utilized to impart a smoother or more perfect surface to the fibers, thereby resulting in a greater tensile strength. In addition the uniform temperature contributes to a better control of the fiber diameter. In comparison to prior art processes the angle of diameters pulled from the same size bushing tips, may be considerably reduced by the present invention. This means, of course, that the size of the bushing tips may be further reduced to produce an even finer individual filament or fiber, i.e., a smaller median or average size diameter.

Since there is a higher and more uniform heat transfer by utilizing the present invention there will be a higher throughput. Longer strands will result and the whole operation, including the final use of the fibers in textiles, will become more efficient. That is, there will be fewer breakdowns while the fiber is being formed and fewer interruption when making the longer strands into textiles, etc.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and the accompanying drawings, in which:

FIGURE 1 is a schematic and diagrammatic illustration of an arrangement of apparatus for producing glass fibers;

FIGURE 2 is a bottom view of the feeder of FIGURE 1;

FIGURE 3 is a cross-sectional view of the feeder of FIGURE 1 shown in combination with an impeller or stirrer according to the teachings of this invention;

FIGURE 4 is a plan view of the impeller of FIGURE 3 taken at lines 4—4 of FIGURE 3;

Figure 5:
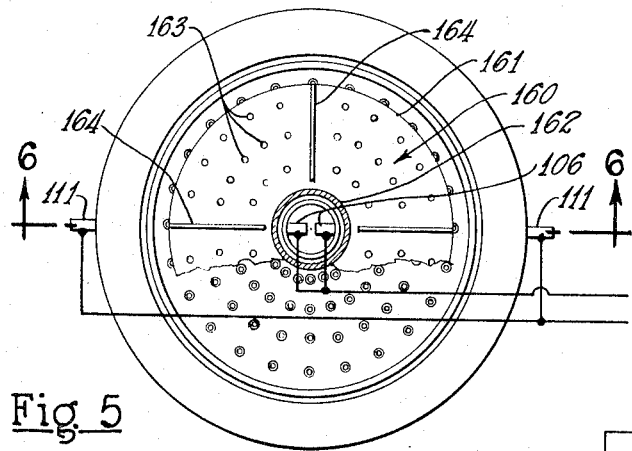
FIGURE 5 is a plan view of a second embodiment of a feeder according to the teachings of this invention.

Referring to FIGURE 1 there is shown a molten glass feeder or bushing 10 containing a molten body of glass 11. The feeder 10 comprises an inner metal chamber 12 of circular cross section (see FIGURE 2) constructed of platinum to resist the action of molten glasses. The bottom wall 13 contains a plurality of openings 14 each having a protrusion or nipple 15 resulting in an aperture in the form of an inverted truncated cone, commonly referred to as a bushing tip, which receives molten glass from the body 11 within the feeder 10.

One or more induction coils 23 are placed around the chamber 12 and the heating chamber and/or the coils are advantageously surrounded with a ceramic heat insulating material 25 in order that uniform conditions may be maintained within the chamber 12.

High frequency current may be supplied by any suitable oscillator capable of operation to supply frequency of several hundred kilocycles. Further a high frequency source capable of operation in the megacycle range may also be supplied for the furnishing of current to the coil. Thus in FIGURE 1 there is indicated by F1 a source operable to provide a frequency of several hundred kilocycles and F2 indicates a source operable to provide a frequency in the megacycle range. Switch S indicated as a double pole double throw may be any suitable switch arrangement for alternately connecting coil 23 with the sources.

The F1 frequency supplies the energy to heat the wall 12, which by conductive effects results in melting the glass or, as in the present case where a premelter is used, maintains the glass within the chamber 12 molten. The frequency of F1, once the glass has become molten and the electrons thereof somewhat mobile, is sufficient to cause induced currents to occur within the glass body.

If the chemical nature of the glass is such that it contains a large amount of alkali, then induced currents cause a heating of the glass and tend to make the temperature and hence the viscosity of the glass within chamber 12 very uniform. As the alkali content of the glass employed decreases higher frequency may be required and accordingly a frequency in the megacycle range may be supplied to the glass from source F2 in addition to or alternatively with the frequency in the kilocycle range, the higher frequency being most suitable for the heating of glasses which contain the aluminum, boron and/or similar atoms. Under the conditions stated the molten glass within the chamber would be extremely uniform for the feeder itself, because of the use of the coil, has no hot spots, conductivity from the wall is high, and the energization resulting from the induced currents within the glass effects uniformity.

Continuous fibers 16 are attenuated from the bushing tips 15 in the bottom of feeder 10 and are gathered together into a strand 17 by passage over a gathering member 18. The fibers are supplied with sizing fluid at the gathering member from a supply tube 19 connected to a source of such sizing material (not shown). The successively formed portions of the strand 17 are thereupon wound into a package 20 by a winder 21 as the strand is caused to traverse the package by a spiral wire-type traverse mechanism 22.

The molten body 11 in the feeder 10 from which the fibers 13 are attenuated is replenished with molten material supplied from an orificed premelting unit 30 disposed above the feeder or bushing 10. The premelting unit may be electrically heated by passage of electrical current therethrough from its terminals 31 which are connected to an electrical energy source through a power transformer 40 by conductors L1 and L2. The molten body 32 within the premelting unit 30 is a melt down of solid quantities of the material fed thereto, such as marbles 36 supplied from a hopper 35. The marbles are supplied in bulk form and are fed to the molten body 32 at a rate determined by the melting rate corresponding to the magnitude of electrical current flowing through the unit 30. The more current flowing through the premelting unit 30, the greater is the consumption of marbles from the hopper 35 and, correspondingly, the faster is the rate of supply of the molten material therefrom in the form of a stream 33 flowed through the orifice in the bottom of the premelting unit.

The rate of flow of material in the stream 33 to the body 11 is matched to the rate of withdrawal of the molten material from the body 11 by continuous modulation provided by a level-control circuit which regulates the current flow and correspondingly the melting rate of the premelter unit 30. The level is sensed by a probe 42 having a tapered tip 48 in contact with the surface of the molten body in the feeder. A potential difference is established between the probe and the body 11 in the feeder by electrical connections to a transformer 52 through a voltage divider 54. The transformer 52 is connected to an energy supply source 51 and transforms the supplied voltage to a relatively low voltage in its secondary 53 for supply to the voltage divider 54. A variable tap 47 of the voltage divider allows selection of the voltage to be applied across the feeder 10 and body 11 through a lead 38 connected to the wall 12 and the probe 42. A coupling transformer 55 in series with the probe 42 transmits a current signal from the circuit loop incorporating the probe to an amplifier 43, which in turn supplies the amplified current signal to a regulator 44. The regulator 44 is connected to a saturable core reactor 41 in the primary of the power circuit for the premelter 30. The amplifier 43 and the regulator 44 are conventional in circuitry and a detailed description is accordingly not necessary in the present instance. Their function, in combination, is to amplify the probe loop current signal and to provide a translated electrical signal from the regulator which will constantly monitor the flow of current in the premelter 30 to regulate the flow of glass in the stream 33 to replenish the glass withdrawn from the feeder 10.

Referring to FIGURE 3 there is illustrated a cross-sectional view of the feeder 10 of FIGURE 1 that has been enlarged to more clearly show the cooperation of the round or cylindrically shaped feeder with an impeller or stirrer 60. The stirrer 60 (see also FIGURE 4) comprises a disc 61 attached to a shaft 62. The disc 61 advantageously may have a plurality of perforations or openings 63 formed therein. One or more fins 64 may be secured to or formed integrally with the upper or lower surface of the disc 61, depending upon the agitation or stirring desired. The fins 64 are preferably extended upwardly to reduce or prevent pressure variations in the body 11 of molten glass directly above apertures 14 formed in the bottom 13 of the feeder 10. The stirrer 60 is formed from a material that will not be affected by the molten body 11.

The stirrer 60 may be rotated by motor means 70 via a bevel gear arrangement 71 connecting the molten means 70 to shaft 62 journaled in support means 72. Vertical motion and/or adjustment of the stirrer 60 within the molten body 11 may be accomplished by the rack and pinion arrangement 75 driven by a suitable power source (not shown).

In operation the impeller means 60 is utilized to stir the molten body 11 to attain an even greater degree of temperature uniformity. A deviation or differential of a few degrees in the temperature of the glass in the feeder changes or modifies its viscosity which results in variations in the size or character of the attenuated filaments. This is of particular importance for glasses which must be run close to the liquids, as is true for the higher strength glasses now being sought.

It is to be noted that the number of perforations or openings 63 in the disc 61 may be increased. If the diameter of the disc 61 is increased to a size just smaller than the inside diameter of the feeder then the increased number of openings 63 and the close fit of disc 61 inside the feeder cooperate to strain the glass through the "mesh-type" opening to prevent the various formations such as seeds, cords, etc. from reaching the apertures in the bottom of the bushing and interfering with the feeding of glass therethrough.

Figure 10:
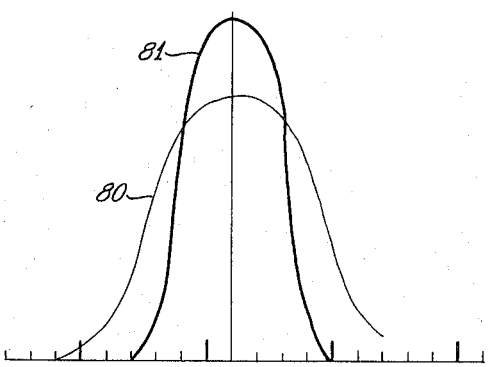
FIGURE 10 is a graphical representation of the improved control of fiber diameter resulting from the use of this invention.

Referring to FIGURE 10 there is graphically illustrated the improved range of diameters of fibers that may be attained by use of this invention. The abscissa is calibrated to indicate diameters of fibers. Curve 80 indicates the range of diameters of fibers from prior processes and apparatus from a particular size bushing tip, the desired diameter being the high point of each curve. By maintaining the temperature more uniformly in accordance with this invention the range of diameters is decreased, as noted by curve 81, and more fibers have an actual diameter much closer to that desired.

An obvious further advantage is available from the decrease in range of fiber diameters. It is now possible to reduce the size of the bushing tips even further, and provide even smaller diameter fibers without the breakage of strands that has resulted heretofore when the diameters of fibers within the production range have fallen below the present cutoff point between 7 and 8/100,000 of an inch.

It should be further noted that with the improved ability to maintain uniform temperatures that it is possible to increase the depth of the feeder 10 and utilize a direct melt process. This is particularly advantageous when the disc 61 is formed to not only assist in stirring but also to act as a strainer to prevent the seed, cord, etc. formations from reaching the bushing tips, as discussed hereinbefore. The ability of the stirrer means 60 to prevent such formations may be enhanced by utilizing the impeller or stirrer means 60 as a first electrode and the metal walls 12 and/or bottom 13 of the feeder as a second electrode and connecting the two electrodes to a suitable power source. This, of course, places an additional heat source directly within the molten body 11 and reduces the dependence of the molten body 11 on radiated heat from the walls and the heat from the currents induced in the molten body 11 by coil 23.

Figure 6:
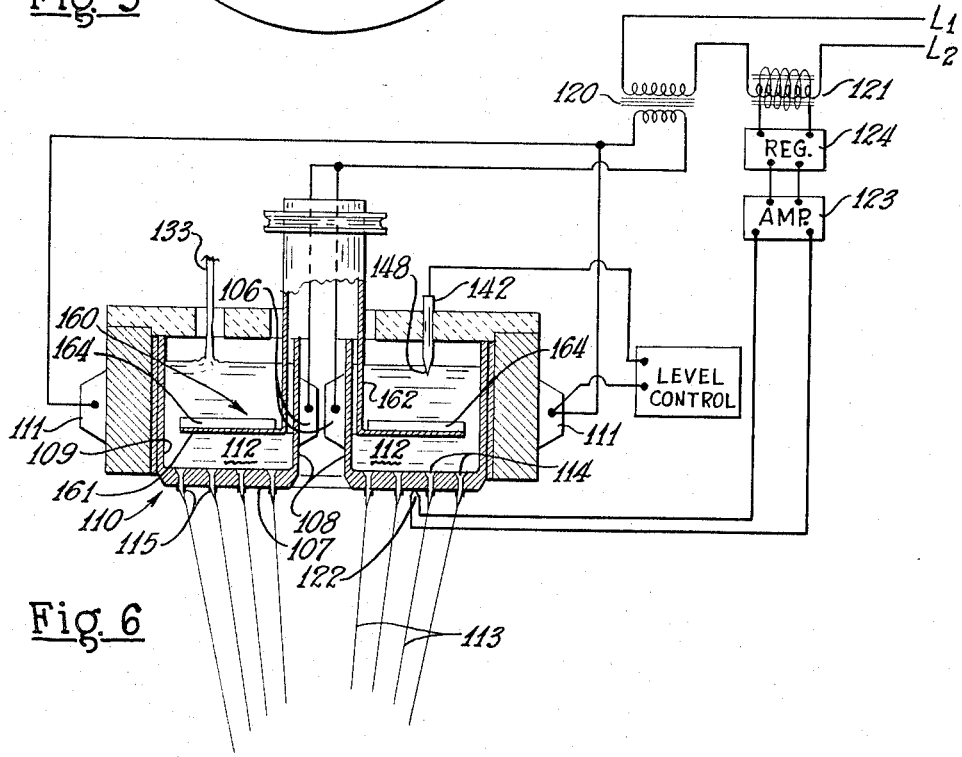
FIGURE 6 is a cross-sectional view of the feeder of FIGURE 5 taken at lines 6—6 of FIGURE 5, along with a schematic diagram of a control circuit associated therewith.

Referring to FIGURES 5 and 6 there is illustrated a a second embodiment of a feeder in accordance with the teachings of this invention. A molten glass feeder 110 is formed with an annular cross section. An outer wall 109 and an inner wall 108 cooperate with a bottom 107 to retain a molten body of glass 112. The body 112 is supplied with heat and maintained at a relatively uniform temperature by direct passage of electrical current through the feeder by way of power connections to terminals 111 and 106 which are attached to walls 109 and 108, respectively. Although only two each of the terminals 111 and 106 are shown for purposes of clarity a plurality of each may be employed. The greater the number of terminals the more distribution points there are for the total current, thereby avoiding "hot spots" previously encountered with resistance heating.

Continuous fibers 113 are attenuated from orifices in the bottom of the feeder 110 and are gathered, supplied with sizing fluid and wound into a package as described hereinbefore with respect to the apparatus shown in FIGURE 1.

The heating current of the feeder or bushing 110 is alternating current supplied over a main power supply line by way of conductors L1 and L2. The power source, for example, may be a 440 volt, 60 cycle source not shown. The alternating current is supplied to the feeder through a transformer 120 which reduces the voltage, for example, to a value in the order of two volts, which; since the feeder 110 is made of low resistance high temperature metal such as platinum; is capable of providing heating current in the order of one or more kilo-amperes. The primary loop of the power circuit for the feeder 110 contains a saturable core reactor 121 which acts as a variable impedance to permit adjustment of the current flow through the feeder for the temperature desired. The saturable core reactor is cooperatively associated with a thermocouple 122 attached to the feeder 110 to generate an electrical signal corresponding to the feeder temperature.

The thermocouple 122 is connected to an amplifier 123 which amplifies the temperature signal supplied from the thermocouple to a regulator 124. The regulator in turn supplies direct current to the saturable reactor to modify the impedance offered by the reactor in the primary of the feeder power circuit to provide automatically a fixed feeder temperature. When the temperature of the feeder tends to rise above a value preselected by adjustment at the regulator 124, the direct current supplied from the regulator to the saturable core reactor 121 is reduced, thereby enlarging the impedance offered by the reactor 121 and diminishing the current flow in the secondary or feeder loop. If the temperature of the feeder tends to drop below the preselected value, the regulator acts to supply additional direct current to the reactor 121, thereby reducing the reactor impedance and increasing the current flow in the secondary loop for a rise in temperature in the feeder 110. This control thereby tends to maintain the feeder at a relatively fixed temperature regardless of the rate of withdrawal of fibers therefrom.

To further assist in maintaining uniform temperature and viscosity of the molten body 112 a stirrer means 160 is utilized. The stirrer means 160 comprises an annular disc or plate 161 secured to a hollow shaft 162. The hollow shaft is adapted to fit over or receive the inner wall 108 of the feeder 110. The disc 164 advantageously has a plurality of perforations 163 formed therein and one or more fins 164 secured thereto in the manner and for the reasons described hereinbefore with respect to the impeller means 60 of FIGURES 3 and 4.

In operation the feeder 110 receives a molten stream 133 of glass from suitable premelting apparatus. The control circuit is operative to maintain the feeder 110 at a relatively fixed temperature and the impeller means 160 is utilized to stir the molten body of glass 112 to attain a uniform temperature and thus a uniform viscosity with the attendant advantages.

The geometric configuration of the feeders 10 and 110 in FIGURES 1 and 6 is of importance. By making the bushing round or annular in cross section the proper cooperation with a round or annular impeller or stirrer is obtained. That is, the use of an arcuate or circular configuration allows a more even stirring action without eddies that result when angled corners are involved. Further, the stirrer may be made to fit closely to the sides of the feeder to perform its straining function and still be rotatable. Therefore, although one type of heating for the feeder may be preferable to the other for certain applications the generic circular configuration of the feeder and stirrer will remain the same.

Figure 7:
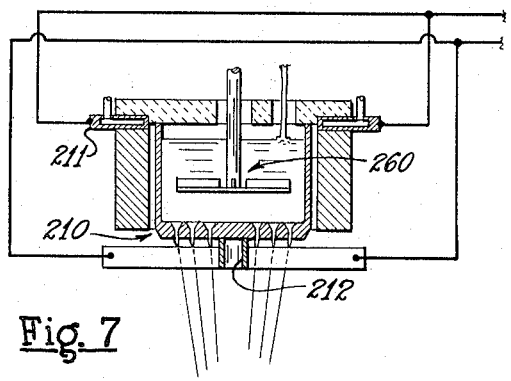
FIGURE 7 is a cross-sectional view of still another embodiment of a feeder and impeller apparatus for use in this invention.
Figure 8:
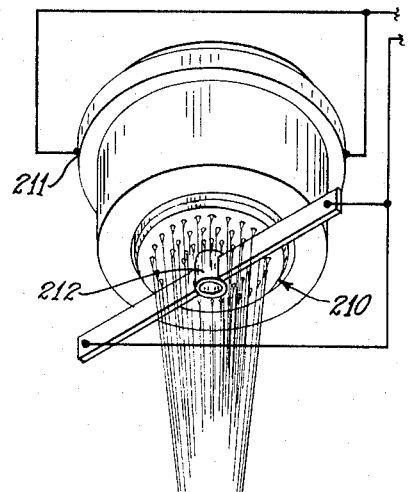
FIGURE 8 is a view in perspective of the feeder of FIGURE 7 as it appears from below and toward the left side.

Referring to FIGURES 7 and 8 there is shown a still further embodiment of a feeder 210 of generally circular configuration. The distinction in the embodiment illustrated here lies in the application of electrical heating energy to the feeder 210. The power current is connected by one or more leads to a circular water-cooled terminal 211 located around the feeder 210. The terminal 211 may also be disposed to serve as a seal if the bushing 210 is used against the bottom of a premelting unit. By sealing the bushing against the bottom of a premelting unit an additional gain is made in maintaining uniform temperatures in the molten glass since the ambient atmosphere is excluded from the open top of the bushing.

A second annular terminal 212 is located on the bottom of the bushing 210. The terminal 212 not only aids in distributing the electrical energy more evenly but may also improve the mechanical characteristics thereof. By utilizing the bus bars, supplying power to terminal 212, as mechanical supports the tendency of the central portion of the bottom of the bushing to sag under very high temperature conditions is eliminated. This, of course, also means that the bushing can be made larger, more fibers attenuated therefrom and production increased from each station.

The impeller or stirrer means 260 functions in the same manner described hereinbefore to maintain uniform temperature and viscosity.

Figure 9:
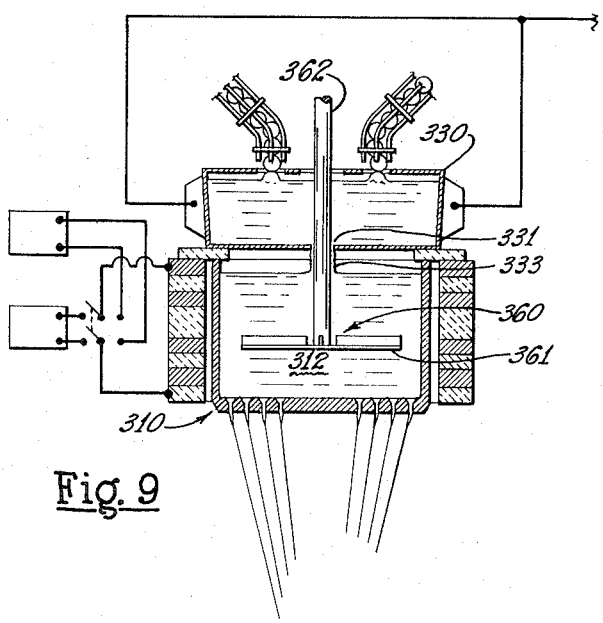
FIGURE 9 is a cross-sectional view of another arrangement of apparatus for producing glass fibers according to this invention.

Referring to FIGURE 9 there is shown another method and arrangement for melting and feeding heat-softenable materials. A bushing or feeder 310 is disposed below and sealed against a premelting unit 330 to gain the attendant advantages from such sealing. An impeller or stirrer means 360 having a shaft 362 is suspended in the molten body of glass 312 in the feeder 310. The shaft 362 extends upwardly through a feeding orifice 331 formed in the bottom of the premelting unit 330 and on out the top for connection to motive means, not shown.

The molten stream 333 from the premelting unit flows through the orifice 331 and down the shaft 362 of the impeller means 360. This further reduces the thermal shock of the molten stream 333 on the molten body 312. It also reduces the purely mechanical disturbance caused when a stream hits a pool. The turbulence that is created is diverted by the disc 361 of the stirrer means 360 from disturbing the flow of glass from the bushing tips in the bottom of the feeder. This arrangement is further advantageous in that it enables an easier attachment of motive power to the shaft 362 of the stirrer means 360 without having a mechanical connection located between a premelting unit and a feeder or bushing.

There has thus been described a method for processing heat-softenable mineral material, such as glass, which includes the steps of maintaining a supply of bodies of heat-softenable mineral material, feeding the bodies from the supply into a melting chamber, heating and melting the bodies in the chamber, stirring the molten material to maintain a uniform temperature and viscosity, and flowing streams of the molten material from orifices formed in the lower region of the chamber. If a premelting process is used then a step of feeding and melting a supply of the mineral material is added and the melting step within the feeder chamber is eliminated. Both electrical resistance and induction heating steps have been described.

Although certain particular forms of the method and means of our invention have been described, it will be understood that we do not wish to be limited thereto since many modifications may be made within the concept of the invention and we, therefore, contemplate covering all modifications which fall within the spirit and scope of our invention.

We claim:

1. Apparatus of the character disclosed, in combination, a metal-walled melting chamber adapted to reduce pieces of heat-softenable mineral material to a molten state, a circular metal-walled feeder chamber, orifice means formed in said melting chamber adapted to flow molten material into said feeder, means for heating the contents of said feeder, and circular disc means concentrically located within said feeder for stirring said molten material in said feeder to maintain a uniform temperature and viscosity of said molten material, said stirring means including a power shaft, said power shaft being directed upwardly through said orifice in said melting chamber, said molten material in said melting chamber being directed downwardly through said orifice along said power shaft to reduce the turbulence of flow.

2. Apparatus of the character disclosed, in combination, a metal-walled melting chamber adapted to reduce pieces of heat-softenable mineral material to a molten state, a circular metal-walled feeder chamber, orifice means formed in said melting chamber adapted to flow molten material into said feeder, means for heating the contents of said feeder, and circular disc means concentrically located within said feeder for stirring said molten material in said feeder to maintain a uniform temperature and viscosity of said molten material, said stirring means being connected as an electrode in the heating means for said feeder chamber.

3. Apparatus of the character disclosed, in combination, a metal-walled chamber adapted to retain a molten supply of fiber forming material, said chamber having a circular side wall and a bottom wall with a plurality of fiber forming orifices formed therein, means for heating said chamber and said molten supply therein, means for stirring said molten supply comprising a circular disc concentrically supported within said circular side wall in said molten supply by a drive shaft, and means for attenuating fibers from molten material issuing from said orifices, said heater means including a first circular terminal connected around the outside of said circular side wall, a second annular terminal concentrically connected to said bottom wall, and means for applying power current to said terminals.

4. Apparatus as defined in claim 3 in which the means for applying current to said annular terminal includes a bus bar means adapted to provide mechanical support to said annular terminal and said bottom wall.

5. Apparatus as defined in claim 3 which further includes a premelting unit disposed on top of said chamber and adapted to provide a supply of molten material to said chamber, said circular terminal being adapted for water cooling and disposed against said premelting unit to effect a seal against ambient atmosphere.

6. Apparatus of the character disclosed, in combination, a metal-walled chamber adapted to retain a molten supply of fiber forming material, said chamber having a circular side wall and a bottom wall with a plurality of fiber forming orifices formed therein, means for heating said chamber and said molten supply therein, means for stirring said molten supply comprising a circular disc concentrically supported within said circular side wall in said molten supply by a drive shaft, and means for attenuating fibers from molten material issuing from said orifices, said chamber including a second inner upstanding side wall located within said outer circular side wall, said two side walls defining a chamber having an annular cross-section.

7. Apparatus as defined in claim 6 in which said circular disc has an opening formed in the center thereof to permit said inner side wall to extend therethrough, and in which said drive shaft is formed with an open center to admit said inner wall.

8. Apparatus as defined in claim 6 in which said heating means includes a first plurality of terminals connected to said outer circular wall, a second plurality of terminals connected to said inner wall, and means for applying power current to said terminals.

References Cited

UNITED STATES PATENTS

| Re. 18,071 | 5/1931 | Hitner | 13—6 X |
| 2,186,718 | 1/1940 | Ferguson. | |
| 2,747,006 | 5/1956 | Barnard | 13—6 |
| 2,749,379 | 6/1956 | Geffcken et al. | 13—6 |
| 2,871,000 | 1/1959 | Dowling | 65—180 X |
| 2,877,280 | 3/1959 | Eden | 13—6 X |
| 3,028,442 | 4/1962 | Glaser | 13—6 |
| 3,056,846 | 10/1962 | Glaser | 13—6 |
| 3,109,045 | 10/1963 | Silverman | 13—6 |

ANTHONY BARTIS, *Primary Examiner.*

JOSEPH V. TRUHE, *Examiner.*